(12) United States Patent
Hill

(10) Patent No.: US 9,758,144 B1
(45) Date of Patent: Sep. 12, 2017

(54) AIR SUPPLY SYSTEM AND METHOD FOR A HOVERCRAFT

(71) Applicant: Charles E. Hill & Associates, Inc., Karnack, TX (US)

(72) Inventor: Charles E. Hill, Karnack, TX (US)

(73) Assignee: Charles E. Hill & Associates, Inc., Karnack, TX (US)

( * ) Notice: Subject to any disclaimer, the term of this patent is extended or adjusted under 35 U.S.C. 154(b) by 324 days.

(21) Appl. No.: 13/951,569

(22) Filed: Jul. 26, 2013

Related U.S. Application Data

(60) Provisional application No. 61/676,056, filed on Jul. 26, 2012.

(51) Int. Cl.
*B60V 1/11* (2006.01)
*B60V 1/16* (2006.01)

(52) U.S. Cl.
CPC ..................... *B60V 1/16* (2013.01)

(58) Field of Classification Search
CPC .... B60V 1/00; B60V 1/02; B60V 1/04; B60V 1/046; B60V 1/14; B60V 1/18; B60V 3/06; B60V 3/065
USPC ............. 180/117, 127, 128; 114/67 A, 67 R; 440/37
See application file for complete search history.

(56) References Cited

U.S. PATENT DOCUMENTS

| | | | | |
|---|---|---|---|---|
| 3,313,476 A | * | 4/1967 | Ross .............................. | 415/197 |
| 3,561,558 A | * | 2/1971 | Parkhouse ................... | 180/120 |
| 3,653,458 A | * | 4/1972 | Donlon ......................... | 180/124 |
| 3,741,144 A | | 6/1973 | Raux | |
| 3,746,116 A | * | 7/1973 | Schwingshandl ............. | 180/121 |
| 3,804,197 A | * | 4/1974 | Grignon et al. .............. | 180/116 |
| 3,811,527 A | * | 5/1974 | Pont et al. .................... | 180/121 |
| 3,987,865 A | * | 10/1976 | Krupp .......................... | 180/127 |
| 4,046,216 A | * | 9/1977 | Cook ............................ | 180/127 |
| 4,122,909 A | * | 10/1978 | Fair et al. .................... | 180/127 |
| 4,175,636 A | * | 11/1979 | Broughton ................... | 180/119 |
| 4,339,017 A | * | 7/1982 | Payne .......................... | 180/127 |
| 4,428,448 A | * | 1/1984 | Tattersall et al. ............. | 180/128 |
| 4,469,334 A | * | 9/1984 | Le Comte .................... | 180/127 |
| 4,516,651 A | * | 5/1985 | Duchateau ................... | 180/127 |

(Continued)

OTHER PUBLICATIONS

"DONAR—Intense Testing of DONAR." ABS Hovercraft. ABS, Dec. 2, 2010. http://www.abs-hovercraft.com/donar-hovercraft/hovercraft-experiments/. Accessed Jan. 25, 2017.*

(Continued)

*Primary Examiner* — Joseph Rocca
*Assistant Examiner* — Conan Duda
(74) *Attorney, Agent, or Firm* — Faegre Baker Daniels LLP

(57) ABSTRACT

A hovercraft includes a lift air supply source having a dynamic air flow area in communication with a central lift air chamber to provide continuous air flow to the central lift air chamber and a static air flow area in communication with an inflatable skirt extending around a periphery of the hovercraft. Air flow from the static air flow area enters the skirt to replenish air leaking from the skirt. The static air flow area has less air flow than the dynamic air flow area. The static air flow area is located at a higher position than the dynamic air flow area to reduce the likelihood of water entering the inflatable skirt when the hovercraft is operated on water.

18 Claims, 14 Drawing Sheets

(56) References Cited

U.S. PATENT DOCUMENTS

| | | | |
|---|---|---|---|
| 4,518,054 A * | 5/1985 | de la Cruz Toran | 180/118 |
| 4,718,501 A * | 1/1988 | Lawler | 180/117 |
| 4,747,459 A | 5/1988 | Penha | |
| 4,821,829 A * | 4/1989 | Gilbert et al. | 180/127 |
| 4,924,958 A * | 5/1990 | Yoshida et al. | 180/128 |
| 4,964,835 A * | 10/1990 | Suto | 446/154 |
| 5,119,897 A * | 6/1992 | Moriwake | 180/127 |
| 5,273,128 A * | 12/1993 | Clendening et al. | 180/120 |
| D344,694 S * | 3/1994 | Stiegler | D12/5 |
| 5,370,197 A | 12/1994 | Goodwin et al. | |
| 5,520,260 A * | 5/1996 | Stiegler | B60V 1/14 180/117 |
| 5,520,261 A * | 5/1996 | Stiegler | B60V 1/11 180/127 |
| 5,522,470 A * | 6/1996 | Stiegler | B60V 1/11 114/67 A |
| 6,056,608 A * | 5/2000 | Phelan, Sr. | B63H 7/02 440/37 |
| 6,715,574 B1 | 4/2004 | Bertelsen et al. | |
| 7,296,526 B1 * | 11/2007 | Dubose et al. | 114/67 A |
| 8,051,935 B2 | 11/2011 | Clapp | |
| 2006/0162638 A1 * | 7/2006 | Boncodin | 114/272 |

OTHER PUBLICATIONS

"DONAR—BMW 12 cyl. engine." ABS Hovercraft. ABS, Dec. 2, 2010. http://www.abs-hovercraft.com/donar-hovercraft/bmw-engine/. Accessed Jan. 25, 2017.*

"DONAR - Innovative transmission system." ABS Hovercraft. ABS, Feb. 15, 2009. http://www.abs-hovercraft.com/donar-hovercraft/innovative-transmission-system/. Accessed Jan. 25, 2017.*

"DONAR—Video." ABS Hovercraft. ABS, Feb. 6, 2009. http://www.abs-hovercraft.com/donar-hovercraft/video-donar-hovercraft/. Accessed Jan. 25, 2017.*

"DONAR Hovercraft." YouTube. Feb 3, 2008. http://www.youtube.com/watch?v=BvzetZSxulc/. Accessed Jan. 25, 2017.*

"Donar." YouTube. Nov 27, 2012. http://www.youtube.com/watch?v=AezYq9PmXvE/. Accessed Jan. 25, 2017.*

* cited by examiner

AIR SUPPLY SYSTEM AND METHOD FOR A HOVERCRAFT

CROSS REFERENCE TO RELATED APPLICATION

This application claims the benefit of U.S. Provisional Application Ser. No. 61/676,056, filed Jul. 26, 2012, which is expressly incorporated by reference herein.

BACKGROUND AND SUMMARY OF THE DISCLOSURE

The present disclosure relates to a hovercraft or air cushion vehicle (ACV) that moves above a surface of the ground or on water on a cushion of air. More particularly, the present disclosure relates to an improved lift air supply system and method for a hovercraft.

Hovercraft or ACVs are well known. Hovercrafts typically include a bellows or inflatable skirt around a perimeter of the vehicle to define an inner lift region or air chamber under the vehicle. The skirt traps air from an air supply source, such as a propeller, to create lift. The lift of this pressurized air causes reduced friction which, in turn, reduces the energy required to propel the vehicle. Hovercraft typically use one or more engine driven propellers to create the lift and one or more engine driven propellers to create thrust to propel and steer the vehicle.

Surfaces over which hovercraft are driven are not always smooth and flat and loads on the hovercraft is not always balanced. There are often uneven surfaces and bumps to navigate. Therefore, the skirt around the perimeter of the hovercraft is flexible to allow it to conform to the irregularities of the surface on which the hovercraft is traversing. Even with a flexible skirt, there are irregularities that are too small or too large for the skirt to follow.

A hovercraft achieves minimal resistance when the surface it is traversing is perfectly flat. As the surface becomes more irregular, low areas allow too much lift air to escape under the skirt and high areas cause the skirt to drag on the surface thereby increasing friction. Problems occur when the same air supply used to provide lift air is also used to inflate the skirt. A specific engine and propeller combination always has a limited amount of air at any given pressure. As the surface area becomes more irregular, the lift pressure within the inner lift air chamber falls as the amount of air escaping under the skirt increases. If the lift pressure and the skirt pressure are from the same source, then the skirt pressure is also reduced when the pressure in the inner lift air chamber falls, thereby causing the skirt to deflate and allowing the center of the hovercraft's hull to touch the ground or surface of the water. This causes friction to increase.

One solution to this problem is to provide an alternate source of pressurized air to the skirt. This has been done by making the skirt airtight, inflating the skirt in a manner similar to a tubeless tire, or by placing one or more airtight tubes within the skirt and inflating those tube(s). All of these alternatives create problems. The first problem is that skirt material needs to be replaced more often dependent on the abrasiveness of the surface on which the hovercraft is travelling. If adhesives are used to secure the skirting material to the vehicle surface to make it airtight, replacing the skirting material becomes more challenging and correspondingly expensive. If additional airtight tubing is used, this adds cost to the hovercraft. Another problem occurs when the skirting material fails as a result of a puncture. Adding an air compressor to compensate for a puncture failure, which will likely happen during the expected life of the skirting material, is generally not feasible.

In one illustrated embodiment of the present disclosure, a hovercraft includes a hull having a base including a forward end, a rear end, and a central opening, a thrust air supply source coupled to the hull adjacent the rear end, and an inflatable skirt coupled to an outer periphery of the base to define a central lift air chamber under the hull. The hovercraft also includes a lift air supply source coupled to the hull. The lift air supply source includes a dynamic air flow area in communication with the central lift air chamber to provide continuous air flow to the central lift air chamber and a static air flow area in communication with the skirt so that air flow enters the skirt to replenish air leaking from the skirt. The static air flow area has less air flow than the dynamic air flow area. In an illustrated embodiment, the static air flow area is located at a higher position than the dynamic air flow area to reduce the likelihood of water entering the inflatable skirt when the hovercraft is operated on water.

In another illustrated embodiment of the present disclosure, a method is provided for supplying lift air to a hovercraft having a hull having a base including a forward end, a rear end, and a central opening, and an inflatable skirt coupled to an outer periphery of the base to define a central lift air chamber under the hull. The method includes providing dynamic air flow to the central lift air chamber to provide continuous lift air flow, and providing static air flow to the skirt to replenish air leaking from the skirt. The static air flow volume is less than the dynamic air flow volume.

Additional features of the present disclosure will become apparent to those skilled in the art upon consideration of the following detailed description of illustrative embodiments exemplifying the best mode of carrying out the invention as presently perceived.

BRIEF DESCRIPTION OF THE DRAWINGS

The foregoing aspects and many additional features of the present system and method will become more readily appreciated and become better understood by reference to the following detailed description when taken in conjunction with the accompanying drawings.

Figure 1:
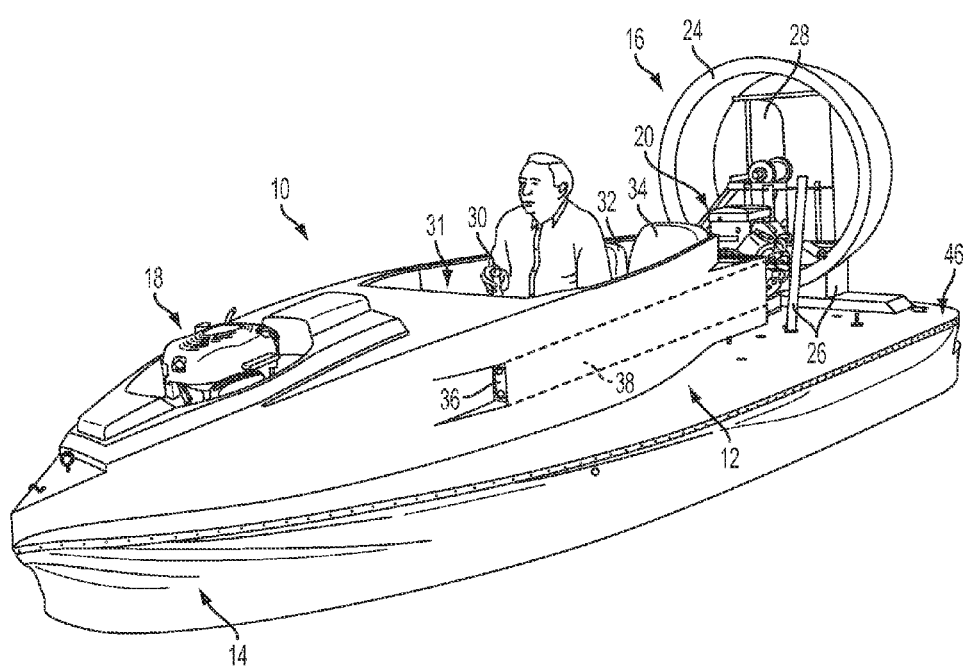
FIG. 1 is a perspective view of a hovercraft of the present disclosure.

Corresponding reference characters indicate corresponding parts throughout the several views. Although the drawings represent embodiments of various features and components according to the present disclosure, the drawings are not necessarily to scale and certain features may be exaggerated in order to better illustrate and explain the present disclosure.

DETAILED DESCRIPTION OF THE DRAWINGS

For the purposes of promoting an understanding of the principles of the present disclosure, reference will now be made to the embodiments illustrated in the drawings, which are described below. The embodiments disclosed below are not intended to be exhaustive or limit the invention to the precise form disclosed in the following detailed description. Rather, the embodiments are chosen and described so that others skilled in the art may utilize their teachings. It is understood that no limitation of the scope of the invention is thereby intended. The invention includes any alterations and further modifications in the illustrated devices and described methods and further applications of the principles of the invention which would normally occur to one skilled in the art to which the invention relates.

Figure 2:
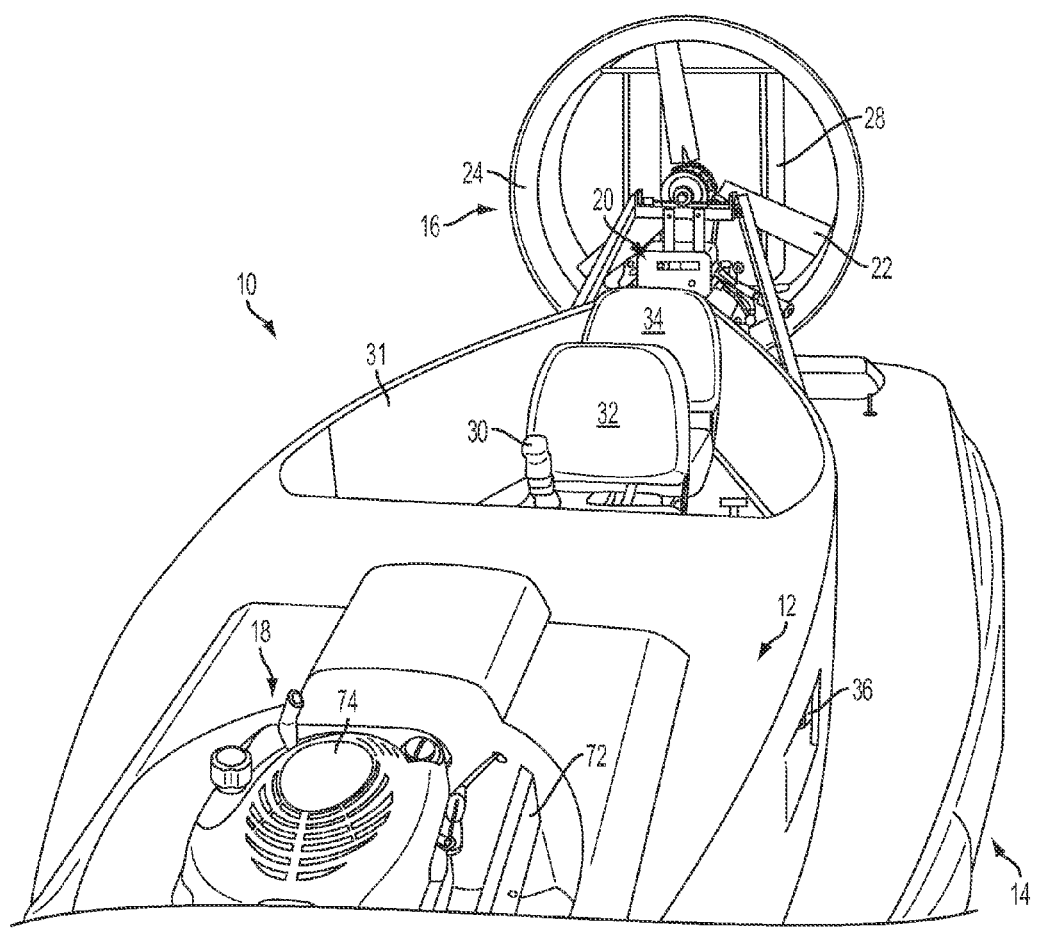
FIG. 2 is a top view of a portion of the hovercraft of FIG. 1.

FIG. 1 illustrates a hovercraft 10 of an illustrated embodiment of the present disclosure. The hovercraft 10 includes a hull 12 and a bellows or inflatable skirt 14 surrounding a perimeter of the hull 12. The hovercraft 10 also includes thrust air supply source 16 to move the hovercraft 10 and a lift air supply source 18 to provide lift air under the hull 12 and inflate the skirt 14. Thrust air supply source 16 includes an engine 20 and a propeller fan blade 22 (see FIGS. 2 and 13) located in a protective cylinder or shroud 24. Supports 26 hold the thrust air supply source 16 in position at the rear end portion 46 of the hull 12. Rudders 28 located behind the thrust air supply source 16 are used to steer the hovercraft 10. Controls 30 for the thrust air supply source 16, the lift air supply source 18, and the rudders 28 are provided in a cockpit 31 adjacent a driver's seat 32. A passenger seat 34 is located behind the driver's seat 32.

In one illustrated embodiment, an air inlet 36 is provided on each side of the hull 12. In one illustrated example, air flow channels 38 are provided within the hull 12 from the air inlets 36 to outlets located near the shroud 24 of thrust air supply source 16. These channels 38 supply additional air to the thrust air supply source 16. In another embodiment, the portions of the hull 12 defining the air flow channels 38 are extended back to the shroud 24 to provide further directional air flow to the thrust air supply source 16. As discussed below, when the shroud 24 is made of plastic culvert material, it has sufficient structural strength to support the portions of the hull 12 mounted thereto.

Figure 3:
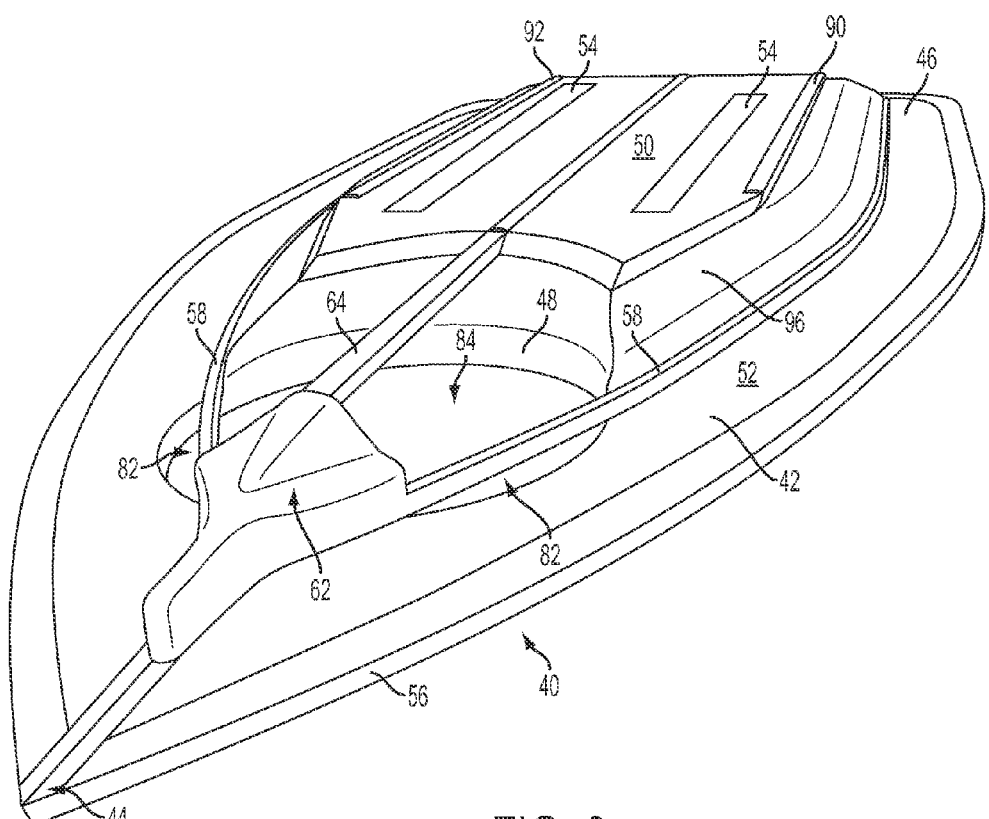
FIGS. 3 and 4 are front and rear perspective views, respectively, of a base of a hull of the hovercraft of FIGS. 1 and 2.
Figure 4:
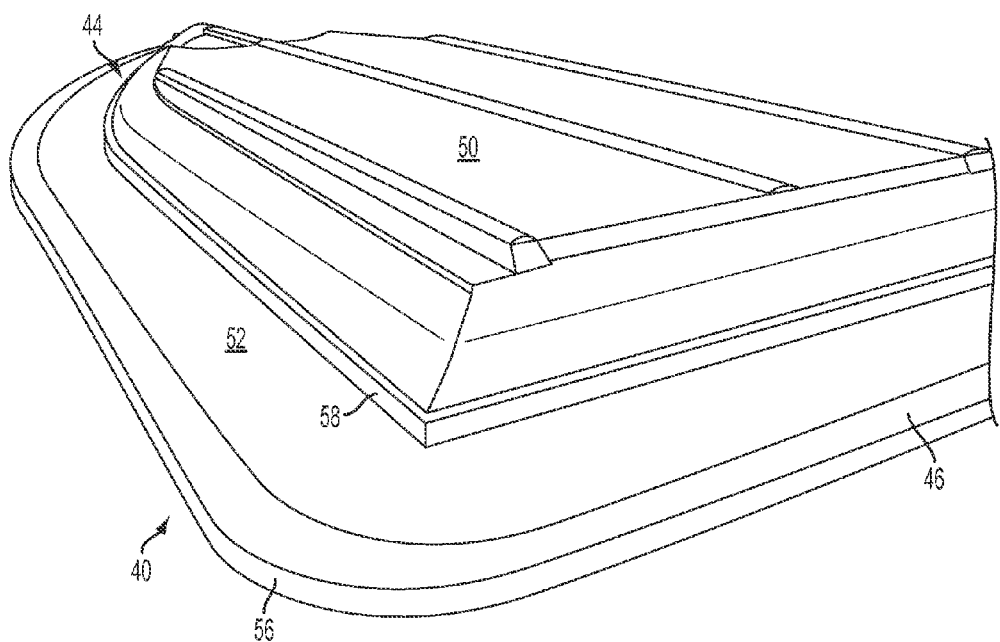

FIGS. 3 and 4 illustrate a base 40 of the hull 12. Base 40 includes a body portion 42 having a front end 44 and rear end 46. A central opening 48 is provided in the base 40 for receiving lift air from lift air supply 18. A bottom surface of the base 40 includes an elevated central portion 50 and a lower outer peripheral portion 52. In one embodiment, skid plates 54 are mounted on the elevated central portion 50 between the outer skid bar 92 and the center skid bar 64 and between the outer skid bar 90 and the center skid bar 64 to reduce friction when the central portion 50 of base 40 engages the ground.

Outer peripheral portion 52 is defined between an outer edge 56 of base 40 and an inner mounting rail 58. As discussed below, skirting material 60 is connected to the outer edge 56 and the inner mounting rail 58 to provide the inflatable skirt 14. A reinforced nose portion 62 is located near the front end 44 of base 40. A skid bar 64 extends across the central opening 48 from nose 62 to the rear of the elevated central portion 50 of base 40 (as best shown in FIG. 4.)

Figure 5:
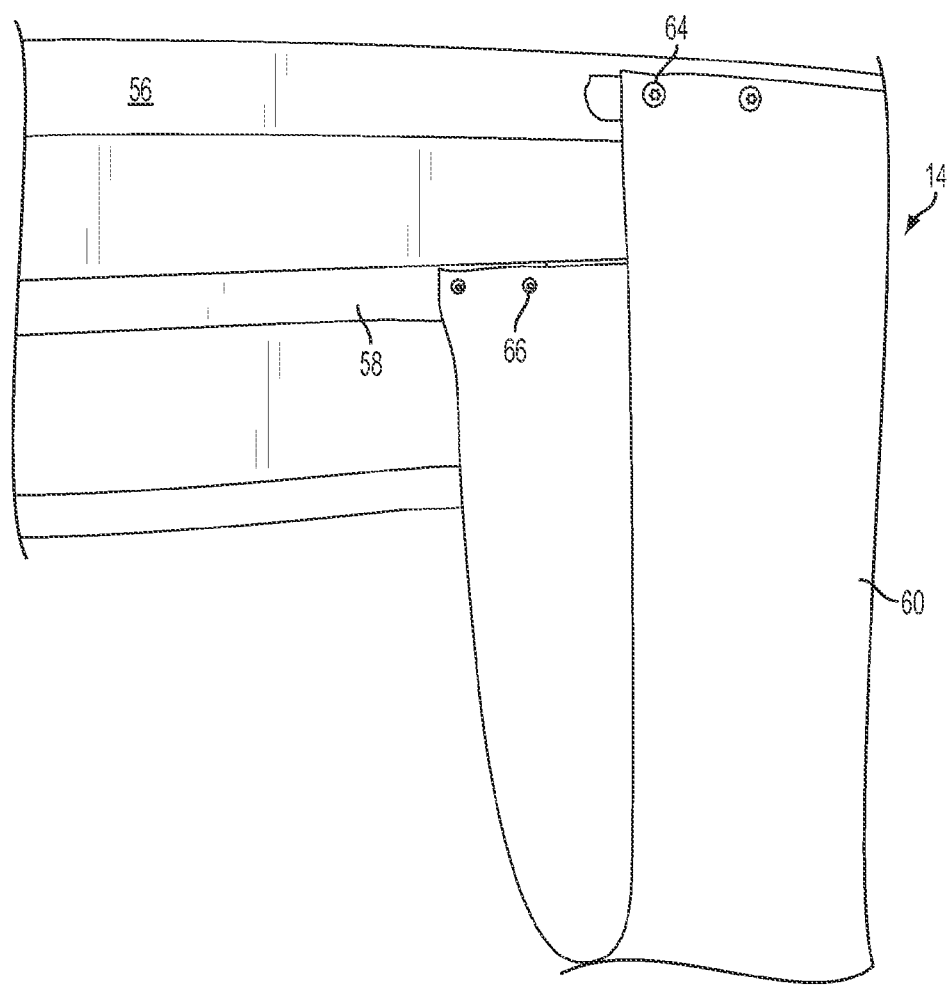
FIG. 5 is a side view illustrating attachment of an inflatable skirt to the base of the hovercraft.

The mounting rail 58 spans across opposite sides of the central opening 48 of the base 40 to separate the lift air from the air used to inflate the skirt 14 as discussed below. The skirting material 60 is attached to the outside edge 56 of base 40 of the hovercraft 10 by fasteners 64 as shown in FIG. 5. The material 60 is then folded into a U-shape and attached to the inner mounting rail 58 by fasteners 66. A small bead of silicon or other suitable sealant (should retain some elasticity when dry and should be removable without damaging the attachment areas of the hull to allow replacement of the skirting) is used under the material 60 in line with the attachment points to reduce leakage of air from the skirt 14. The location of the inner mounting rail 58 is about one inch below the outer edge 56 in an illustrated embodiment.

Figure 6:
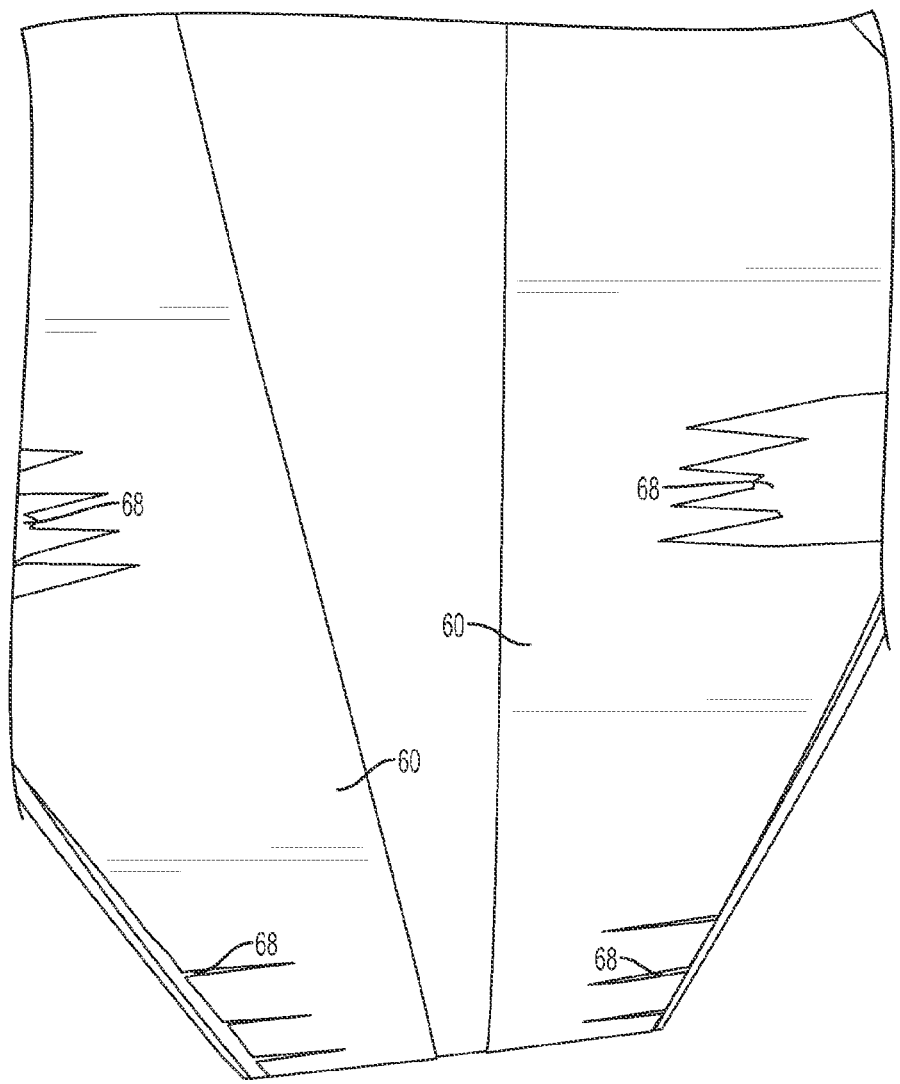
FIGS. 6 and 7 illustrate cutouts formed in a skirting material for attachment to the base to form the skirt.
Figure 7:
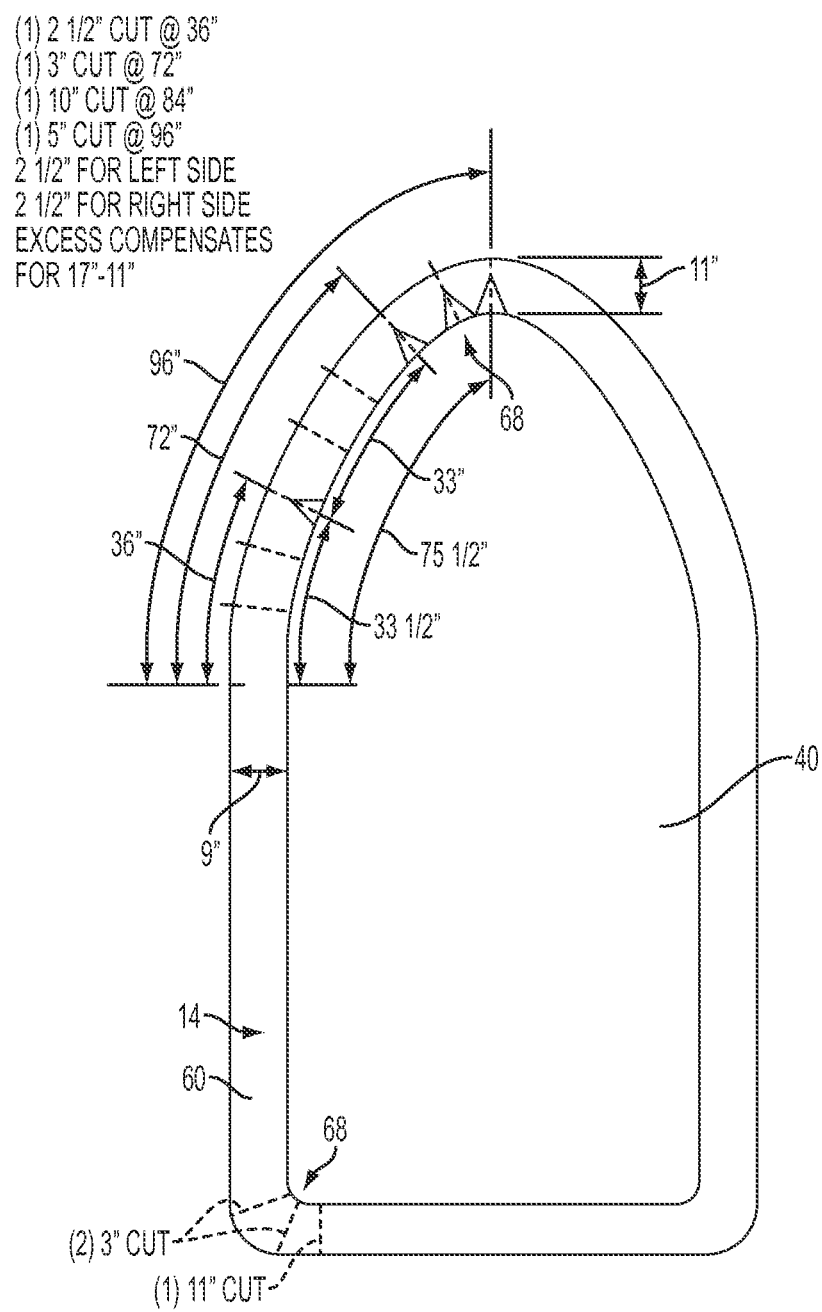

The skirting material 60 includes a plurality of cut-out sections 68 shown in FIGS. 6 and 7 to permit the material 60 to be attached to the inner mounting rail 58 which has a shorter overall length than the outer edge 56 of base 40. Therefore, the folds and cut-out sections 68 in the skirt material 60 make up the difference in length of the inside attachment points on mounting rail 58 and the outside attachment points on edge 56.

In making the cut-outs 68 prior to mounting the skirt material 60, one should realize that the skirt 14 forms a modified "U" shape when inflated. The total distance that is being subtracted for the inside attachment point is the width of the cut starting at the inside edge to a depth of the inside leg of the "U". In an illustrated embodiment, the inside leg of the "U" is 9¾", the bottom is 9", and the outside leg is 10¾". As an example, if the difference between the inside measurement and the outside measurement is 3", at the point the reduction is being made, a rectangle measuring 3" wide×9¾" deep would be cut. A second cut would then be made starting at the top of the first cut. This cut would be a triangle with a base of 3" wide and 9" high. The 9" representing the base of the "U". The remainder of the material represents the outside of the leg of the "U" and requires no reduction as it is the outside dimension.

Figure 8:
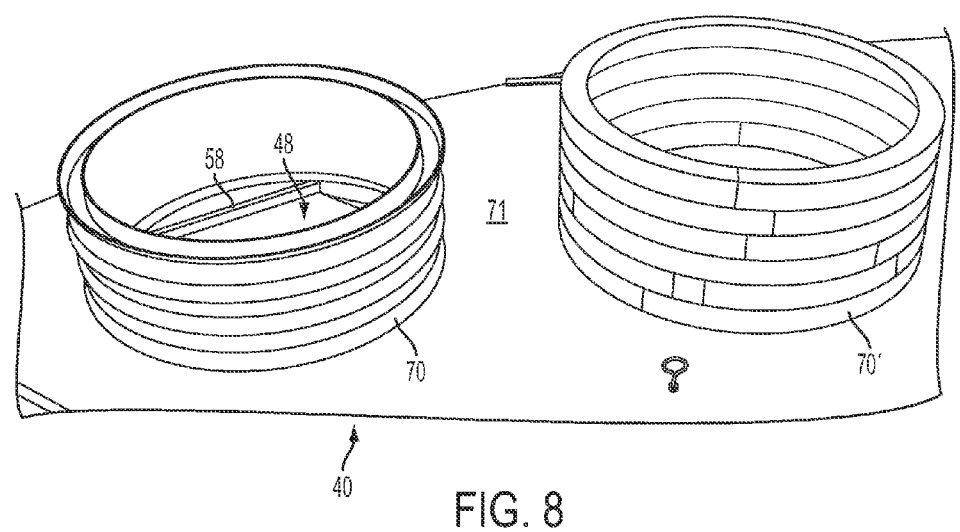
FIG. 8 illustrates two different embodiments of a protective shroud for a lift air supply engine and propeller.
Figure 9:
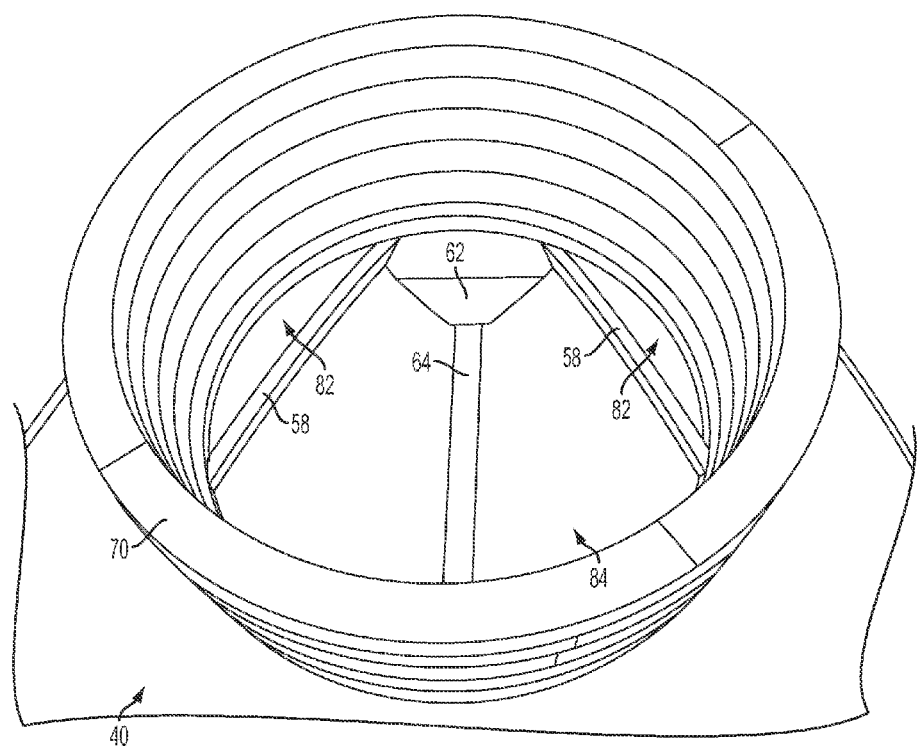
FIG. 9 illustrates the lift air shroud and a central opening formed in the base of the hovercraft to define static and dynamic air flow areas.
Figure 10:
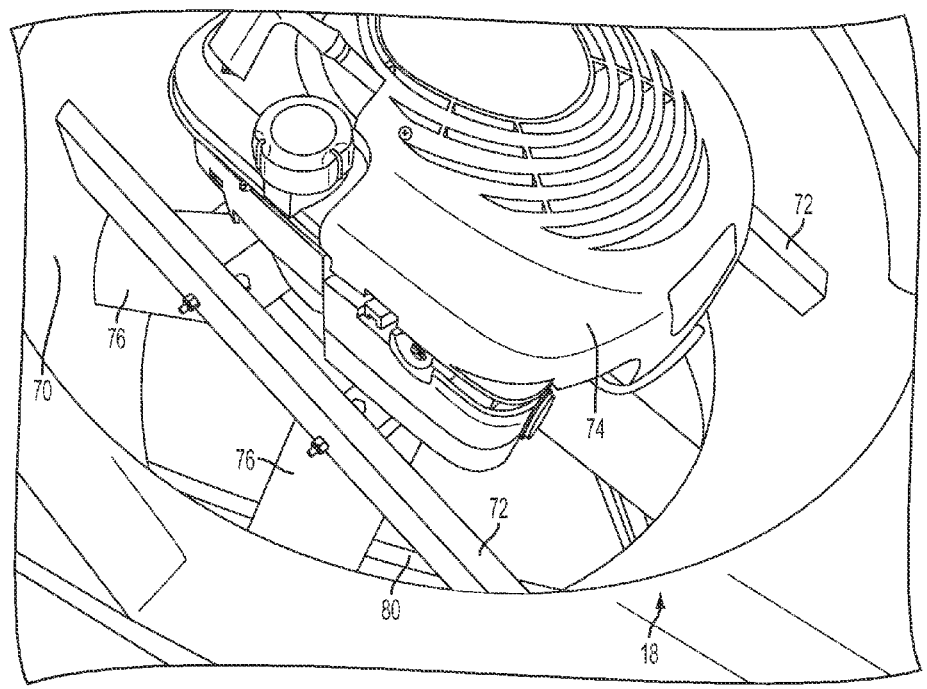
FIG. 10 illustrates the lift air engine and propeller mounted in the lift air shroud.

FIGS. 8-10 illustrate a protective cylindrical shroud 70 located on a top surface 71 of base 40 for mounting the lift air supply source 18 to the base 40. Shroud 70 is substantially the same size as the central opening 48 in the base 40 for receiving lift air from lift air supply source 18. FIG. 10 shows supports 72 for mounting an engine 74 of lift air supply 18 in the shroud 70. Propeller fan blades 76 are located below engine 74 to provide the lift air source.

Figure 13:
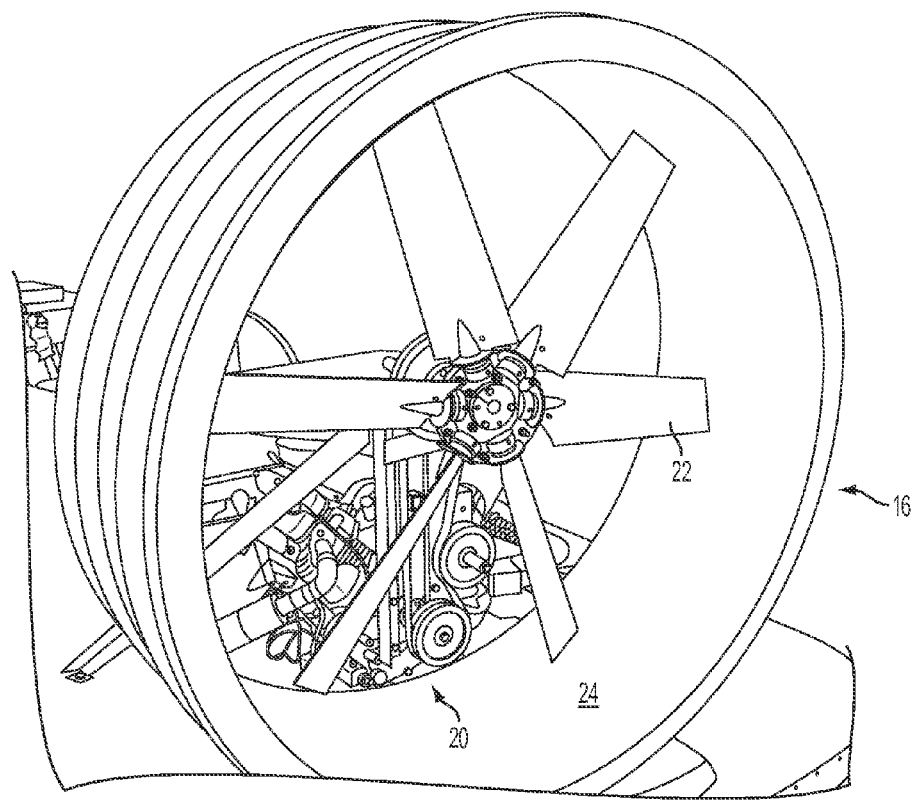
FIG. 13 illustrates a thrust air supply source of the hovercraft.

In an illustrative embodiment, the thrust air supply shroud 24 and lift air supply shroud 70 are formed from a 42 inch and a 24 inch, respectively, inside diameter plastic culvert. The corrugated outer wall of the shrouds 70 and 24 best shown in FIGS. 8 and 13 provide structural strength for mounting components to the shrouds 24, 70. In illustrated embodiments, the plastic culverts are painted with plastic paint or filled with foam, sanded and then painted to improve the appearance of the shrouds 24, 70. The thrust air shroud 24 may be bolted to one-half inch plywood material, for example, to facilitate adjustment and removal of the shroud 24, when necessary. The utilization of plastic culvert pieces for shrouds 24, 70 reduces construction costs significantly. The cost of the piece of plastic culvert is several times less than the cost of just the extruded polystyrene material used to construct a single shroud. Plastic culverts are machine made with tolerances much closer than any handmade polystyrene shroud. The difference in weight is insignificant. The plastic culvert shrouds 24, 70 offer much more structural strength than using extruded polystyrene as a base material. In addition, the plastic culvert material is strong enough to use screws for attaching mounting points for stabilizer bars, mounting plates, etc. To improve the appearance, foam may be used to fill in the corrugations, to cover any attachment pieces, or to simply provide a more pleasing design. This can then be painted to further improve the appearance.

In an alternative embodiment shown in FIG. 8, a polystyrene (or other suitable material) sheet is cut into a plurality of desired shapes to form a shroud 70'. The shroud 70' is then lined with resin and fiberglass to produce the lift air shroud 70' or the thrust air shroud 24.

Figure 12:
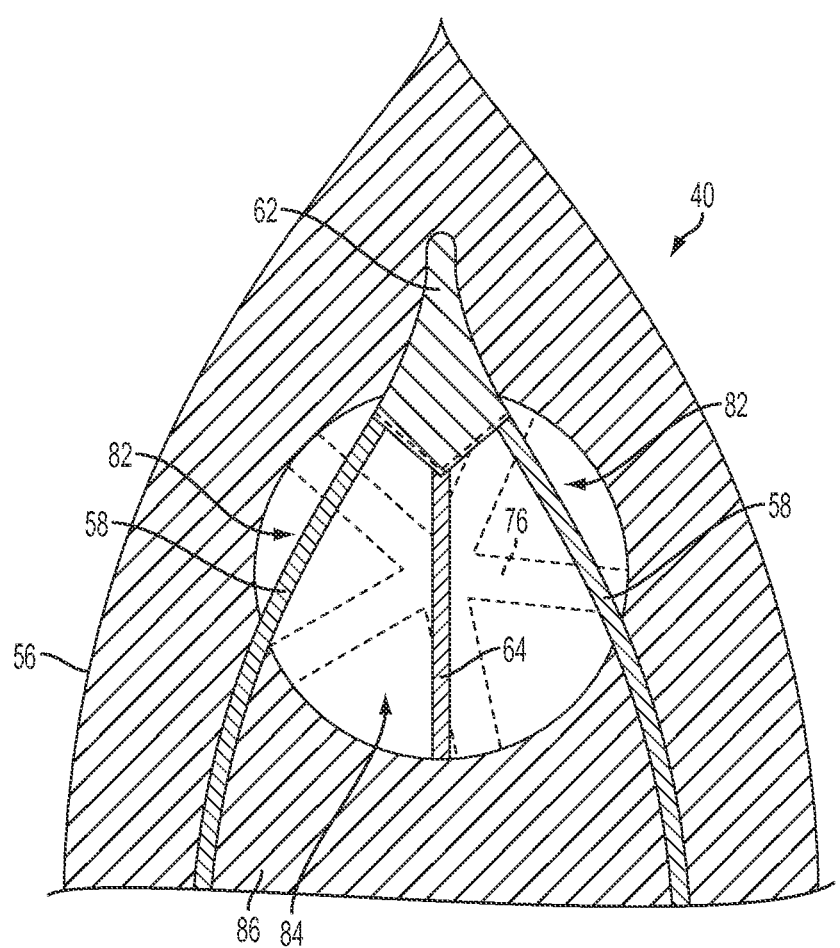
FIG. 12 is a bottom view of a portion of the hull of the hovercraft illustrating the static and dynamic air flow entry areas for the skirt and lift air chamber, respectively.

The majority of the cross sectional area of opening 48 is used for the lift air flow area 86 as best shown in FIGS. 3, 9 and 12. The area of the two chords, defined by the two portions of the inner mounting rail 58 crossing the opening 48, defines the air inlet flow areas 82 to inflate the skirt 14. The center skid bar 64 supports the hovercraft 10 when there is no lift air or the pressure of the lift air has dropped to a point where the skirt 14 will not hold the hovercraft 10 above the surface. One or more skid plate areas 54 also support the hovercraft 10 when on the ground.

The skirt 14 creates a semi-sealed area between the hull 12 and the ground permitting the hovercraft 10 to "hover" in ground effect. Lift air from air supply 18 is controlled by the lift engine throttle control (not shown). This regulates air pressure and volume in and under the skirt 14. Steering is accomplished with moveable rudders 28 mounted behind the thrust propeller 22. The top and bottom of the lift air chamber 86 are formed by the bottom surface 50 of base 40 and the surface over which the hovercraft 10 is travelling, respectively. The sides of the lift air chamber 86 are formed by the flexible skirt 14.

To solve the problem of the skirt 14 collapsing when the lift air pressure drops because of an uneven surface, the system and method of the present disclosure provides a lift air supply 18 that uses two different types of air supply systems. The lift air supplied to lift air chamber 86 is dynamic and requires significant airflow. The skirt 14 air is considered static because airflow is used only to replenish air that escapes the skirt 14 due to leakage. The central opening 48 in base 40 is divided into two outer static air flow areas 82 in communication with the skirt 14 and an inner dynamic air flow area 84 in communicating with the lift air chamber 86 as shown in FIGS. 3 and 12. Air flow to the static air flow areas 82 is less than the air flow to the dynamic air flow area.

Figure 11:
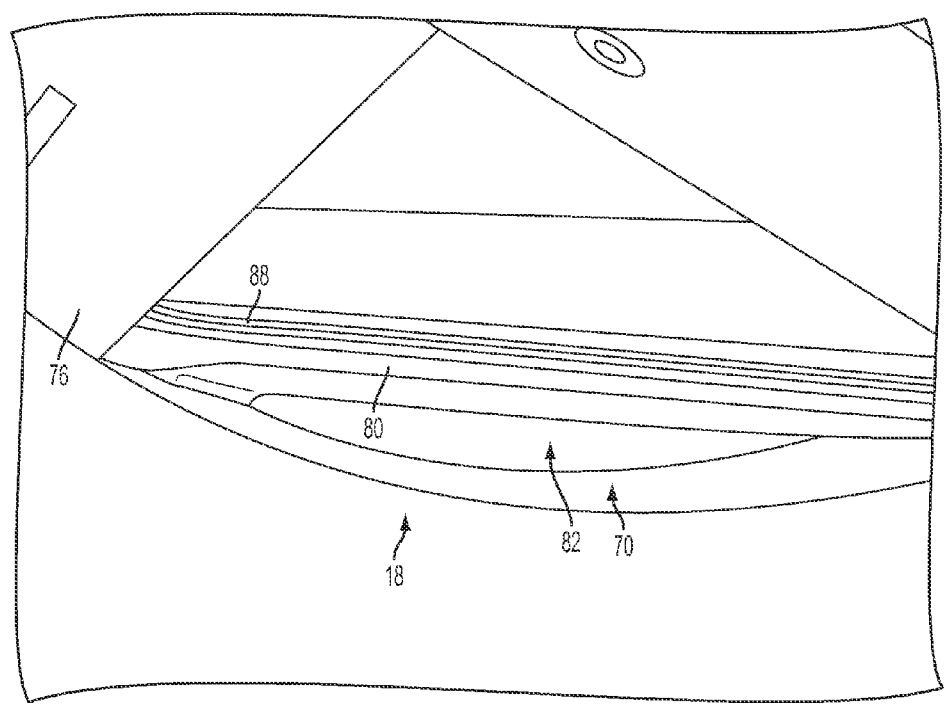
FIG. 11 illustrates an extension bar and seal located within the lift air shroud to define one of the static air entry areas for inflating the skirt.

FIG. 11 illustrates how the inner mounting rail portions 58 extending below the central opening 48 of base 40 are raised upwardly into the shroud 70 by extension bars 80. As discussed above, the inner mounting rail portions 58 extending through the central opening 48 define chords intersecting the opening 48 to provide the static air flow areas 82. The top surfaces of extension bars 80 shown in FIG. 11 are located in close proximity to the tips of the lift propeller blades 76.

As discussed above, the distance from the propeller blade 76 to the extension bars 80 is minimized to help separate the dynamic lift air supply from the static skirt supply air. To minimize the chance of a propeller failure caused by the propeller blade 76 hitting the extension bars 80, a flexible, elastic seal 88 is located on top of the extension bars 80 as shown in FIG. 11. Seal 88 is made of rubber in one illustrated embodiment. The leading edges of the propeller blades 76 are higher than the trailing edges so that the blades wipe across the seals 88 during rotation of the propeller. In a highly controlled environment, such as a turbine, blades run within a few thousands of an inch of their confinement. In a product such as a hovercraft 10 designed to be built at a minimum cost, the seal 88 solves the same problem as very accurate machining. Therefore, the tips of propeller blades 76 provide the static air flow for the skirt 14 in areas 82 and the remainder of the blades 76 provides the dynamic air for lift air chamber 86 in area 84.

To demonstrate the validity of this solution, a test was run where the skirt pressure was measured for both level and uneven surfaces. The uneven surface was simulated by actually raising the hovercraft 10 so that the skirt 14 was completely above the surface. In the case where the diagonal bars formed by mounting rail 58 remained low as shown in FIG. 3, the pressure of the air within the skirt 14 dropped to near zero when the hovercraft 10 was lifted. When the extension bars 80 were added as shown in FIG. 11 to create static air flow areas 82, the skirt pressure only dropped by approximately 50%. Losing only 50% of the skirt pressure, under a worst case condition, is acceptable.

In one design the chord length was 20.5" and the distance from the center to the chord was 7.25". The combined area of the two chords was 148.75 sq. in. In another embodiment, the chord length was 11.5" and the distance from the center to the chord was 11.25". The combined area of the two chords was 17.26 sq. in.

Raising the height of mounting rail 58 with the extension bars 80 and seals 88 also minimizes the introduction of water into the skirt 14. With the rail 58 at the original height (see FIG. 3) and the lift engine not running, significant water may enter the skirt 14 through the skirting air inlets 82. The elevated extension bars 80 reduce water entering the skirt 14. For example, it would take wave height of over 15 inches for water to enter the skirt 14 over the extension bars 80 located within the shroud 70 in the illustrated embodiment.

In summary, the system and method of the present disclosure provides two different types of air flow systems for bellows or skirt inflation and for the lift pressure, namely static air flow (little or no flow) to the skirt 14 and dynamic air flow to the inner lift air chamber 86. Dynamic flow provides continuous air flow into the lift air chamber 86 below the hovercraft and then outwards beneath the skirt 14. Although the skirt 14 supplies some lift to the hovercraft, its primary function is to provide the air capture region or lift chamber 86 beneath the hovercraft 10 for the lift function as well as to provide a uniform area for airflow from beneath the hovercraft 10. A hovercraft 10 achieves its efficiency of motion by creating an air space between the surface over which it is travelling and its skirt 14. This results in nearly zero friction between the skirt 14 and the surface.

The system and method of the present disclosure also provides elevated air inputs for the skirt 14 for static air flow which are located above the entry point of the dynamic airflow used to supply lift air to the underside of the hovercraft hull 12. A hovercraft of conventional design typically has both the skirt and lift chamber air inputs at the same level. Therefore, the present system and method takes advantage of the two types of airflow and also inhibit the entry of water into the skirt 14 when the hovercraft 10 is sitting without the lift engine/fan running or when the water over which the hovercraft 10 is travelling is rough.

The system and method of the present disclosure also provides retention of air pressure in the skirting when the pressure of the dynamic lift air drops, as a result of an uneven surface, for example. An uneven surface can be found regardless of the type of surface. For example, dirt, sand, stone, water, ice or snow may provide uneven surfaces. The skirt 14 works best if it closely follows the contours of the surface over which it is travelling. This maintains the air chamber 86 beneath the hovercraft 10 where the lift is supplied as well as providing a nearly frictionless surface over which the hovercraft 10 is travelling.

Figure 14:
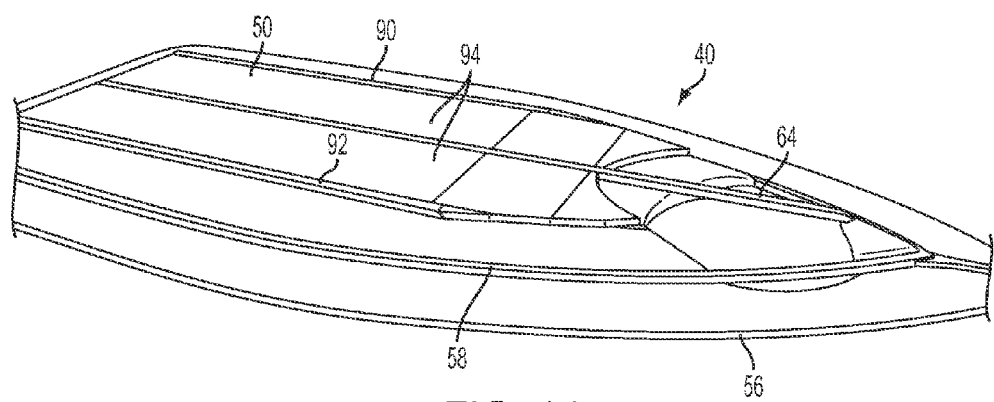
FIG. 14 is another perspective view of the base of the hull of the hovercraft.

FIGS. 3 and 14 disclose additional details of center skid bar or center strut 64 on the bottom surface of the base 40 of hull 12. FIGS. 3 and 14 also disclose first and second outer struts 90 and 92 on opposite sides of the elevated portion 50 of base 40. The struts 64, 90 and 92 are illustratively each 1"×1" wooden struts (hardwood in the preferred embodiment). The struts 64, 90 and 92 are illustratively covered with KEVLAR brand material. A resin is used to attach the KEVLAR brand material to the struts 64, 90 and 92. The struts 64, 90 and 92 add rigidity to the hull 12 and protect the bottom surface 50 from damage when sitting on a potentially damaging surface, such as a stone covered shoreline, for example. For floatation and weight reduction purposes, the hull 12 is mostly comprised of extruded polystyrene foam 94 as best shown in FIG. 14. Although this type of foam 94 has a 15 psi to as much as 80 psi or more density factor, it is still subject to damage in this application.

The center strut 64 runs nearly the full length of the hull 12 and therefore adds the most rigidity. The two outer struts 90 and 92 cover the part of the hull 12 where passengers ride and therefore add rigidity to that portion of the hull 12. Adding the resin attached KEVLAR brand material covering to each of the struts 64, 90 and 92 enhances their ability to withstand impact from objects that may come into contact with the struts 64, 90 and 92.

To further protect and strengthen the bottom of the hull 12, a paint with a tensile strength of 2000 psi or greater is applied with a thickness of 15 mils or greater to the total exposed portion of the bottom of the hull 12. For example, "StyroSpray 1000" coating available from SPEEDLINER® may be used. This coating dries to provide a very smooth and durable surface.

Also in an illustrated embodiment, a sloped area 96 is provided in the base 40 between the inner mounting rail 58 for connecting the skirt 14 and the outer struts 90 and 92 as shown in FIG. 3. When the skirt 14 is in a non-inflated state, it is desirable to minimize the weight of the hovercraft 12 and passengers that is resting on any part of the skirting material 60 of skirt 14. The sloped area 96 allows the skirt 14 to have an area to collapse into without being subjected to the weight or an edge of the hovercraft 10.

While embodiments of the present disclosure have been described as having exemplary designs, the present invention may be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this invention pertains.

The invention claimed is:

1. A hovercraft comprising:
a hull having a base including a forward end, a rear end, and a central opening;
a thrust air supply source coupled to the hull adjacent the rear end;
an inflatable skirt coupled to an outer periphery of the base to define a central lift air chamber under the hull;
a lift air supply source coupled to the hull, the lift air supply source including a lift air shroud coupled to the hull, the lift air shroud is in fluid communication with the central opening of the base and positioned fully forward of a cockpit, the lift air shroud being divided into at least two regions to provide a static air flow area and a dynamic air flow area, the dynamic air flow area being in fluid communication with the central lift air chamber to provide continuous air flow to the central lift air chamber and the static air flow area being in fluid communication with the skirt so that air flow enters the skirt to replenish air leaking from the skirt, the static air flow area having less air flow than the dynamic air flow area; and
an air flow channel enclosed by and passing through an interior of the hull, the air flow channel having an air inlet receiving air from the environment independent of the lift air supply source and an outlet located upstream of and spaced apart from an inlet of the thrust air supply source.

2. The hovercraft of claim 1, further comprising at least one extension bar extending upwardly from the base of the hull into the lift air shroud to define the static air flow area within the lift air shroud, and a propeller having a plurality of blades located within the lift air shroud adjacent a top surface of the extension bar.

3. The hovercraft of claim 1, wherein the base includes an outer edge and an inner mounting rail spaced apart from the outer edge, the skirt being formed from a skirting material having a first end coupled to the outer edge of the base and a second end coupled to the inner mounting rail to define the inflatable skirt.

4. The hovercraft of claim 3, wherein the inner mounting rail intersects the central opening of the base to define at least two regions to provide the static air flow area and the dynamic air flow area.

5. The hovercraft of claim 4, further comprising at least one extension bar extending upwardly from the inner mounting rail and into the lift air shroud to define the static air flow area within the lift air shroud, and a propeller having a plurality of blades located within the lift air shroud adjacent a top surface of the extension bar.

6. The hovercraft of claim 2, further comprising an engine located in the lift air shroud to drive the propeller and provide an air supply to the static and dynamic air flow areas.

7. The hovercraft of claim 6, further comprising a support coupled to the lift air shroud to support the engine within the shroud.

8. The hovercraft of claim 2, further comprising a seal coupled to the top surface of the extension bar, the seal being located adjacent to the blades of the propeller.

9. The hovercraft of claim 1, wherein the lift air shroud is formed from a corrugated culvert.

10. The hovercraft of claim 1, wherein the base includes a central elevated portion located behind the central opening to support the hovercraft on the ground when the skirt is not inflated.

11. The hovercraft of claim 10, further comprising a plurality of struts coupled to the central elevated portion of the base.

12. The hovercraft of claim 10, wherein the base further includes a reinforced nose portion located between the forward end of the base and the central opening and a skid bar extending from the reinforced nose portion to a rear end portion of the central elevated portion of the base.

13. The hovercraft of claim 1, wherein the static air flow area is located at a higher position than the dynamic air flow area to reduce the likelihood of water entering the inflatable skirt when the hovercraft is operated on water.

14. The hovercraft of claim 1, wherein the base includes an outer edge, an inner mounting rail spaced apart from the outer edge, and a central elevated portion, the base including a sloped area between the inner mounting rail and the central elevated portion, the sloped area providing a region for the skirt to enter upon deflation of the skirt so that the weight of the hovercraft is supported by the central elevated portion.

15. The hovercraft of claim 4, wherein the inner mounting rail intersecting the central opening of the base defines a central dynamic air flow area and first and second side static air flow areas within the central opening of a base.

16. The hovercraft of claim 3, wherein the skirting material is a sheet of material having cutout sections to accommodate a shorter length of the inner mounting rail compared to an overall length of the outer edge of the base.

17. A hovercraft comprising:
a hull having a base including a forward end, a rear end, and a central opening;
a thrust air supply source coupled to the hull adjacent the rear end;
an inflatable skirt coupled to an outer periphery of the base to define a central lift air chamber under the hull; and
a lift air supply source coupled to the hull, the lift air supply source including a first means for providing dynamic air flow volume to the central lift air chamber to provide continuous lift air flow and means for providing static air flow volume to the inflatable skirt to replenish air leaking from the inflatable skirt, the static air flow volume being less than the dynamic air flow volume;
and an air flow channel enclosed by and passing through an interior of the hull, the air flow channel having an air inlet receiving air from the environment independent of the first means and an outlet located upstream of and spaced apart from an inlet of the thrust air supply source.

18. A hovercraft comprising:
a hull having a base including a forward end, a rear end, and an opening along a longitudinal centerline of the hull;
a thrust air supply source coupled to the hull adjacent the rear end;
an inflatable skirt coupled to an outer periphery of the base to define a central lift air chamber under the hull;
a lift air supply source coupled to the hull, the lift air supply source including a lift air shroud coupled to the hull, the lift air shroud providing a first air outlet in fluid communication with the central lift air chamber through the opening in the base to provide continuous air flow to the central lift air chamber and a second air outlet in fluid communication with the skirt to replenish air leaking from the skirt; and
an air flow channel enclosed by and passing through an interior of the hull, the air flow channel having an air inlet receiving air from the environment independent of the lift air supply source and an outlet located upstream of and spaced apart from an inlet of the thrust air supply source.

\* \* \* \* \*